United States Patent
Poussin et al.

(10) Patent No.: US 12,454,268 B2
(45) Date of Patent: Oct. 28, 2025

(54) HANDLING WHEEL SLIP IN A VEHICLE

(71) Applicant: Volvo Truck Corporation, Gothenburg (SE)

(72) Inventors: Olivier Poussin, Lyons (FR); Philemon Chavrier, Lyons (FR); Renaud Laperriere, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 24 days.

(21) Appl. No.: 18/438,650

(22) Filed: Feb. 12, 2024

(65) Prior Publication Data
US 2024/0278784 A1  Aug. 22, 2024

(30) Foreign Application Priority Data
Feb. 17, 2023  (EP) .................................... 23157334

(51) Int. Cl.
*B60W 30/18* (2012.01)
*B60K 17/356* (2006.01)
*B60K 23/08* (2006.01)

(52) U.S. Cl.
CPC ..... *B60W 30/18172* (2013.01); *B60K 17/356* (2013.01); *B60K 23/0808* (2013.01); *B60K 2023/0866* (2013.01); *B60W 2520/26* (2013.01)

(58) Field of Classification Search
CPC ..... B60W 30/18172; B60W 2720/403; B60W 2720/406; B60W 2520/263; B60W 2520/266; B60W 2520/26; B60W 2540/18; B60W 10/119; B60K 17/356; B60K 23/0808; B60K 2023/0866; B60K 7/0015
See application file for complete search history.

(56) References Cited

U.S. PATENT DOCUMENTS

| 5,368,120 | A | 11/1994 | Sakai et al. |
| 5,540,299 | A | 7/1996 | Tohda et al. |
| 2002/0040269 | A1* | 4/2002 | Billig .................. B60T 8/1755 701/87 |

(Continued)

FOREIGN PATENT DOCUMENTS

| EP | 2759438 A2 | 7/2014 |
| EP | 3628524 A1 | 4/2020 |

OTHER PUBLICATIONS

Extended European Search Report for European Patent Application No. 23157334.6, mailed Jul. 24, 2023, 10 pages.

*Primary Examiner* — Lori Wu
(74) *Attorney, Agent, or Firm* — Withrow & Terranova, PLLC

(57) ABSTRACT

A computer system comprising processing circuitry configured to handle wheel slip a vehicle is provided. The vehicle comprises a first axle. The first axle comprises at least two wheels. Each of the at least two wheels of the first axle is drivable by at least two hydraulic motors. The processing circuitry is configured to obtain a slip condition of the vehicle. The processing circuitry is configured to, based on the obtained slip condition, trigger an adjustment of pressure and/or flow to be supplied to at least one of the at least two hydraulic motors in the vehicle. Triggering the adjustment comprises triggering an adjustment of pressure and/or flow between at least two hydraulic motors, and/or triggering adjustment of pressure and/or flow supplied by a source.

15 Claims, 5 Drawing Sheets

(56) References Cited

U.S. PATENT DOCUMENTS

| | | | |
|---|---|---|---|
| 2008/0128189 A1* | 6/2008 | Pruitt | B62D 11/04 |
| | | | 701/87 |
| 2009/0005939 A1 | 1/2009 | Dueckinghaus et al. | |
| 2009/0127928 A1* | 5/2009 | Udagawa | B66F 9/0655 |
| | | | 303/113.2 |
| 2013/0197772 A1* | 8/2013 | Brand | B60K 17/356 |
| | | | 701/82 |

* cited by examiner

HANDLING WHEEL SLIP IN A VEHICLE

PRIORITY APPLICATIONS

The present application claims priority to European Patent Application No. 23157334.6, filed on Feb. 17, 2023, and entitled "HANDLING WHEEL SLIP IN A VEHICLE," which is incorporated herein by reference in its entirety.

TECHNICAL FIELD

The disclosure relates generally to vehicle motion control. In particular aspects, the disclosure relates to handling wheel slip in a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

To manage traction of a vehicle, hydraulic motors can be installed in some wheels. The traction of the vehicle can be increased by both having an axle traditionally driven by a motor or engine, and one axle driven by the hydraulic motors. However, coordinating torque to be applied in different axles is complex and may lead to improper traction of a vehicle if handled incorrectly, in particular with regards to wheel slip of one or more wheels.

Hence, there is a strive to improve traction of vehicles.

SUMMARY

According to a first aspect of the disclosure, a computer system comprising processing circuitry configured to handle wheel slip of one or more wheels of a vehicle is provided. The vehicle comprises a first axle. The first axle comprises at least two wheels. Each of the at least two wheels of the first axle is drivable by at least two hydraulic motors. Each hydraulic motor is operable to drive a respective wheel out of the at least two wheels of the first axle based on a respective pressure and/or flow. Each respective pressure and/or flow may be an oil pressure and/or an oil flow. Each respective pressure and/or flow to each respective hydraulic motor is individually controlled by a distribution valve comprised in the vehicle. The pressure and/or flow is supplied by a source comprised in the vehicle. The source may be an oil pump. The processing circuitry is further configured to obtain a slip condition of the vehicle. The slip condition is indicative of a slip in the at least two wheels of the first axle and/or at least two wheels of a second axle. The processing circuitry is further configured to, based on the obtained slip condition, trigger an adjustment of pressure and/or flow to be supplied to at least one of the at least two hydraulic motors, by any one or both of:
  based on the obtained slip condition, triggering an adjustment of a pressure and/or flow distribution in the distribution valve, and/or
  based on the obtained slip condition, triggering an adjustment of the pressure and/or flow supplied by the source.

The first aspect of the disclosure may seek to improve traction of a vehicle. A technical benefit may include improved traction of the vehicle. This is since the vehicle will apply the pressure and/or flow to the be supplied to the at least two hydraulic motors based on the slip condition of any of the wheels of the first and/or second axle. In this way, if one or more wheels of the vehicle slips, the pressure and/or flow is adjusted in the at least two hydraulic motors such that the vehicle can compensate for the wheels slip and improve its traction.

According to a second aspect of the disclosure, a computer-implemented method for handling wheel slip of one or more wheels of a vehicle is provided. The vehicle comprises a first axle. The first axle comprises at least two wheels. Each of the at least two wheels of the first axle is drivable by at least two hydraulic motors. Each hydraulic motor is operable to drive a respective wheel out of the at least two wheels of the first axle based on a respective pressure and/or flow. Each respective pressure and/or flow may be an oil pressure and/or an oil flow. Each respective pressure and/or flow to each respective hydraulic motor is individually controlled by a distribution valve comprised in the vehicle. The pressure and/or flow is supplied by a source comprised in the vehicle. The source may be an oil pump. The method comprises, by processing circuitry of a computer system, obtaining a slip condition of the vehicle. The slip condition is indicative of a slip in the at least two wheels of the first axle and/or at least two wheels of a second axle. The method comprises, by the processing circuitry, based on the obtained slip condition, triggering an adjustment of pressure and/or flow to be supplied to at least one of the at least two hydraulic motors, by any one or both of:
  based on the obtained slip condition, triggering an adjustment of a pressure and/or flow distribution in the distribution valve and/or
  based on the obtained slip condition, triggering an adjustment of the pressure and/or flow supplied by the source.

The second aspect of the disclosure may seek to improve traction of a vehicle. A technical benefit may include improved traction of the vehicle. This is since the vehicle will apply the pressure and/or flow to the be supplied to the at least two hydraulic motors based on the slip condition of any of the wheels of the first and/or second axle. In this way, if one or more wheels of the vehicle slips, the pressure and/or flow is adjusted in the at least two hydraulic motors such that the vehicle can compensate for the wheels slip and improve its traction.

In some examples, including in at least one preferred example, optionally, triggering the adjustment of the pressure and/or flow distribution in the distribution valve comprises: adjusting a distribution of pressure and/or flow in the distribution valve based on the obtained slip condition. In these examples, the adjusted pressure and/or flow in the distribution valve is to be distributed by the distribution valve between the at least two hydraulic motors.

A technical benefit may include improved traction of the vehicle. This is since if there is a slip on any one or more wheels of the vehicle, the distribution of pressure and/or flow may need to be adjusted such that one hydraulic motor has increased flow and/or pressure compared to another hydraulic motor in the at least two hydraulic motors. While adjusting the distribution may comprise adjusting a ratio of pressure and/or flow, the adjustment may be individually controlled for each hydraulic motor in the at least two hydraulic motors.

In some examples, including in at least one preferred example, optionally triggering the adjustment of the pressure and/or flow distribution in the distribution valve comprises: adjusting an individual pressure and/or flow of at least one hydraulic motor of the at least two hydraulic motors by adjusting a respective proportional valve of the distribution valve based on the obtained slip condition. In this example, the respective proportional valve is arranged to individually control a respective pressure and/or flow of the at least one hydraulic motor.

A technical benefit may include improved traction of the vehicle. This is since the at least one hydraulic motor can be individually controlled to best adapt to the slip condition. For example, if there is an increase in slip of any wheel on the first or second axle. The wheel controlled by the at least one hydraulic motor may need to adapt its torque for best grip and traction.

In some examples, including in at least one preferred example, optionally triggering the adjustment of the pressure and/or flow supplied by the source comprises: based on the obtained slip condition, triggering the source to initiate a pressure and/or flow supplied by the source. A technical benefit may include improved traction of the vehicle. This is since the pressure and/or flow can be initiated when triggering the adjustment, i.e., when there is need to handle a wheel slip of the second axle, the pressure and/or flow can be supplied.

In some examples, including in at least one preferred example, optionally when the obtained slip condition indicates a slip above a threshold in any one or more out of the at least two wheels of the second axle, triggering the adjustment of pressure and/or flow to be supplied to the at least one of the at least two hydraulic motors by triggering an increase of pressure and/or flow to be supplied to each of the at least two hydraulic motors.

A technical benefit may include improved traction of the vehicle. This is since the increase of pressure and/or flow to be supplied to each of the at least two hydraulic motors ensures that the at least two wheels of the first axle can compensate for the wheel slip of the at least two wheels of the second axle. In this way, the traction of the vehicle is improved and the wheel slip of the at least two wheels of the second axle is reduced.

In some examples, including in at least one preferred example, optionally when the obtained slip condition indicates a slip above a threshold in a slipping wheel of the at least two wheels of the first axle, triggering the adjustment of pressure and/or flow to be supplied to the at least one of the at least two hydraulic motors comprises: triggering a decrease in pressure and/or flow of a respective hydraulic motor of the slipping wheel.

A technical benefit may include improved traction of the vehicle. This is since, the slip of the slipping wheel will be reduced if pressure and/or flow to the respective hydraulic motor is decreased.

In some examples, including in at least one preferred example, optionally the method further comprises, after a time period after decreasing the pressure and/or flow of the respective hydraulic motor of the slipping wheel, and upon detecting that a slip of the slipping wheel is below a threshold, triggering an increase in pressure and/or flow of the respective hydraulic motor of the slipping wheel.

A technical benefit may include improved traction of the vehicle. This is since, when the slip is no longer an issue, i.e., the slip of the slipping wheel is below the threshold, the pressure and/or flow of the respective hydraulic motor of the slipping wheel can be increased to improve the grip of the wheel.

In some examples, including in at least one preferred example, optionally triggering the adjustment of the pressure and/or flow to be supplied to the at least one of the at least two hydraulic motors further comprises maintaining a pressure and/or flow to be supplied to a hydraulic motor of the at least two hydraulic motors. In these examples, the hydraulic motor is driving a non-slipping wheel out of the at least two wheels of the first axle.

A technical benefit may include improved traction of the vehicle. This is since the non-slipping wheel can be maintained in a non-slipping state, while still adjusting pressure and/or flow for another hydraulic motor affecting another wheel of the first axle.

In some examples, including in at least one preferred example, optionally when the obtained slip condition indicates a slip above a threshold in each of the at least two wheels of the first axle, triggering the adjustment of pressure and/or flow to be supplied to the at least one of the at least two hydraulic motors by triggering a decrease in pressure and/or flow of each of the at least two hydraulic motors. A technical benefit may include improved traction of the vehicle. This is since if the at least two wheels of the first axle, traction is improved and slip is reduced when the pressure and/or flow to each of the at least two hydraulic motors is decreased.

In some examples, including in at least one preferred example, optionally triggering the adjustment of pressure and/or flow to be supplied to the at least one of the at least two hydraulic motors is further based on a steering wheel angle of the vehicle.

A technical benefit may include improved traction of the vehicle. This is since when turning, the at least two wheels have a different distance to cover and wheel speed of each of the wheels will have to be adjusted for improved drivability. For example, when turning left, a rightmost wheel of the first axle may need to be adjusted such that its corresponding hydraulic motor has increased pressure and/or flow.

In some examples, including in at least one preferred example, optionally obtaining the slip condition of the vehicle comprises obtaining wheel speeds of the at least two wheels of the first axle and/or wheels speeds of the at least two wheels of the second axle.

A technical benefit may include improved traction of the vehicle. This is since the adjustment of pressure and/or flow to be supplied to at least one of the at least two hydraulic motors can be performed with improved accuracy based on the differing wheel speed.

In some examples, including in at least one preferred example, optionally obtaining the slip condition of the vehicle comprises any one or more out of:
  obtaining a difference in wheel speed between the at least two wheels of the first axle, and/or
  obtaining a difference in wheel speed between the at least two wheels of the second axle,
  obtaining a difference in wheel speed between wheels of the second axle and wheels of the first axle.

A technical benefit may include improved traction of the vehicle. This is since the adjustment of pressure and/or flow to be supplied to at least one of the at least two hydraulic motors can be performed with improved accuracy based on the differing wheel speed.

According to a third aspect of the disclosure, a vehicle comprising the computer system of the first aspect is provided.

The third aspect may seek to improve traction of the vehicle. A technical benefit may include improved traction of the vehicle. This is since the vehicle will apply the pressure and/or flow to be supplied to the at least two hydraulic motors based on the slip condition of any of the wheels of the first and/or second axle. In this way, if only one wheel slips, the pressure and/or flow is adjusted such that the vehicle has optimal or at least improved traction.

In some examples, including in at least one preferred example, optionally the vehicle comprises a first axle. In these examples, the first axle comprises at least two wheels. In these examples, each of the at least two wheels of the first axle is drivable by at least two hydraulic motors. In these examples, each hydraulic motor is operable to drive a respective wheel out of the at least two wheels of the first axle based on a respective pressure and/or flow. In these examples, the respective pressure and/or flow may be an oil pressure and/or an oil flow. In these examples each respective pressure and/or flow to each respective hydraulic motor may be individually controlled by a distribution valve comprised in the vehicle. In these examples, the pressure and/or flow is supplied by a source comprised in the vehicle. The source may be an oil pump.

In some examples, including in at least one preferred example, optionally the vehicle comprises a second axle and the second axle comprises at least two wheels, wherein each of the at least two wheels of the second axle is drivable by at least one electric motor and/or combustion engine comprised in the vehicle.

A technical benefit may include improved traction of the vehicle. This is since the at least two hydraulic motors can improve traction to the vehicle by complementing torque applied by the at least one electric motor and/or combustion engine comprised in the vehicle to the second axle, by applying torque to the first axle using the at least two hydraulic motors.

In some examples, including in at least one preferred example, optionally the at least two hydraulic motors are arranged to compensate for a wheel slip in one or more wheels of the vehicle, when the at least one electric motor and/or combustion engine applies a torque to any one or more out of the at least two wheels of the second axle.

A technical benefit may include improved traction of the vehicle. This is since the at least two hydraulic motors can improve traction for the vehicle, and to compensate for the wheel slip to wheels driven by the at least one electric motor and/or combustion engine comprised in the vehicle.

In some examples, including in at least one preferred example, optionally a processing circuitry of the computer system is configured to perform the method according to the second aspect.

A technical benefit may include all corresponding technical benefits of the second aspect.

According to a fourth aspect of the disclosure, a computer program product is provided. The computer program product comprises program code for performing, when executed by the processing circuitry, the method according to the second aspect.

According to a fifth aspect of the disclosure, a non-transitory computer-readable storage medium is provided. The non-transitory computer-readable storage medium comprises instructions, which when executed by the processing circuitry, cause the processing circuitry, to perform the method according to the second aspect.

The fourth and/or fifth aspect may seek to improve traction of the vehicle. A technical benefit is the same and/or corresponds to the technical benefits of the first, second, and/or third aspects.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

Examples are described in more detail below with reference to the appended drawings.

DETAILED DESCRIPTION

Figure 1:
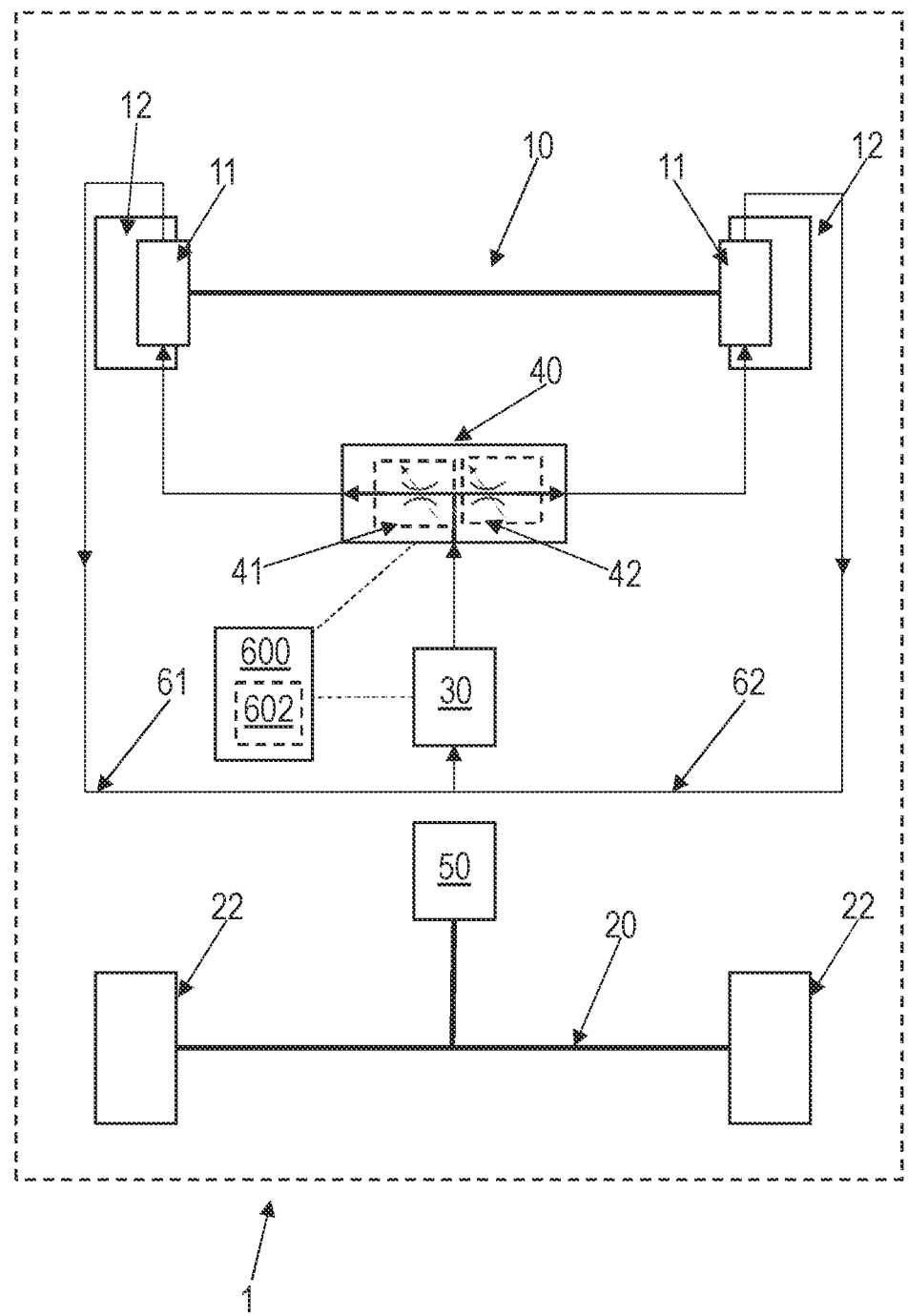
FIG. 1 illustrates an exemplary vehicle according to an example.

FIG. 1 is an exemplary vehicle 1 according to an example.

The vehicle 1 may be any suitable vehicle, e.g., heavy-duty vehicle, car, bus, truck, etc.

The vehicle 1 comprises at least two axles, a first axle 10 and a second axle 20.

The first axle 10 comprises at least two wheels 12. The at least two wheels 12 of the first axle 12 may be steerable or non-steerable, e.g., by a steering wheel in the vehicle 1.

The second axle 20 comprises at least two wheels 22. The at least two wheels 22 of the second axle 20 may be drivable by at least one electric motor and/or combustion engine 50 comprised in the vehicle 1. The at least two wheels 22 of the second axle 20 may be steerable or non-steerable, e.g., by a steering wheel in the vehicle 1.

In the example of FIG. 1, the first axle 10 is a front axle and the second axle 20 is a rear axle, however, the first axle 10 may be on any suitable axle of the vehicle 1, and the second axle 20 may also be on any suitable axle of the vehicle 1. For example, the first axle 10 may be a rear axle and the second axle 20 may be a front axle.

In the example of FIG. 1, only two axles are illustrated, however, vehicle 1 may comprise any number of axles.

At least two hydraulic motors 11 are comprised in the vehicle 1. Each of the at least two wheels 12 of the first axle 10 is drivable by at least two hydraulic motors 11. Each hydraulic motor 11 is operable to drive a respective wheel out of the at least two wheels 12 of the first axle 10 based on a respective pressure and/or flow. The respective pressure and/or flow may typically be an oil pressure and/or oil flow, but any other suitable fluid and/or gas may also apply. Each respective pressure and/or flow to each respective hydraulic motor 11 is individually controlled by a distribution valve 40 comprised in the vehicle 1. The pressure and/or flow is supplied by the source 30 comprised in the vehicle 1. The source 30 may be a pump, e.g., an oil pump, which pumps the pressure and/or flow to pass through the distribution valve 40 to drive the at least two hydraulic motors 11. The pressure and/or flow may be pumped in a closed circuit in any suitable manner, e.g., back through the source 30 using pressure and/or flow pipes and/or tubes 61, 62. The distribution valve 40 may comprise at least two proportional valves 41, 42. Each respective proportional valve 41, 42 is arranged to individually control a respective pressure and/or flow of a respective hydraulic motor in the at least two hydraulic motors 11.

In other words, the source 30 may control a total flow and/or pressure to be sent towards the distribution valve 40, and the distribution valve 40 may, e.g., using respective proportional valves 41, 42, individually control, for each hydraulic motor in the at least two hydraulic motors 11, the respective pressure and/or flow to be allowed to pass through the distribution valve 40 to the respective hydraulic motor.

In some examples, when the source 30 supplies a higher pressure than what is controlled by the distribution valve 40 to pass through to the at least two hydraulic motors 11, the source 30 may be triggered to reduce the supplied pressure and/or flow. In some examples, the distribution valve 40 may additionally or alternatively be a discharge valve comprised with a return pipe to an oil tank and/or the source 30.

In some examples, pressure is distributed between the at least two hydraulic motors 11 by means of a ratio, but if the pressure in any of the at least two hydraulic motors 11 exceeds what is to be supplied to one of the at least two hydraulic motors, the pressure and/or flow from the source 30 is triggered to be reduced.

In some examples, the at least two hydraulic motors 11 may be arranged to compensate for a wheel slip in one or more wheels of the vehicle 1, e.g., when the at least one electric motor and/or combustion engine 50 applies a torque to any one or more out of the at least two wheels 22 of the second axle 20. In other words, the pressure and/or flow flowing through each respective hydraulic motor in the at least two hydraulic motors 11 may be adjusted in examples herein to compensate for a detected wheel slip. The wheel slip may be in one or more wheels of the first axle 10 and/or the second axle 20.

Some examples herein may be performed at least partly by a computer system 600, and/or a processing circuitry 602 therein. The processing circuitry 602 may be one or more processors, and/or any suitable processing circuitry.

The computer system 600 and/or the processing circuitry 602 may be comprised in the vehicle 1. The computer system 600 and/or the processing circuitry 602 may also be comprised in a remote location communicatively coupled to vehicle 1. The computer system 600 and/or the processing circuitry 602 may in some examples be comprised in a server or a control station, e.g., which may be arranged to at least partly remotely control and/or to provide instructions to the vehicle 1.

The computer system 600 and/or the processing circuitry 602 may further, directly and/or indirectly, control and/or communicate with any suitable entity comprised in the vehicle 1 e.g., sensors and/or actuators of the vehicle 1.

The computer system 600 and/or the processing circuitry 602 may be able to control a pressure and/or flow supplied by the source 30, e.g., by adjusting and/or initiating flow and/or pressure of the source 30.

The computer system 600 and/or the processing circuitry 602 may be able to individually control pressure to be supplied to each respective hydraulic motor in the at least two hydraulic motors 11 by adjusting flow and/or pressure allowed by the distribution valve 40, to pass through to each respective hydraulic motor in the at least two hydraulic motors 11, e.g., by adjusting any one or more out of the proportional valves 41, 42.

The computer system 600 and/or the processing circuitry 602 may be able to detect and/or obtain information of a wheel slip in any of the wheels of the vehicle 1. E.g., by means of sensors measuring rotational speed of the wheels of the first axle 10 and/or the second axle 12.

Figure 2:
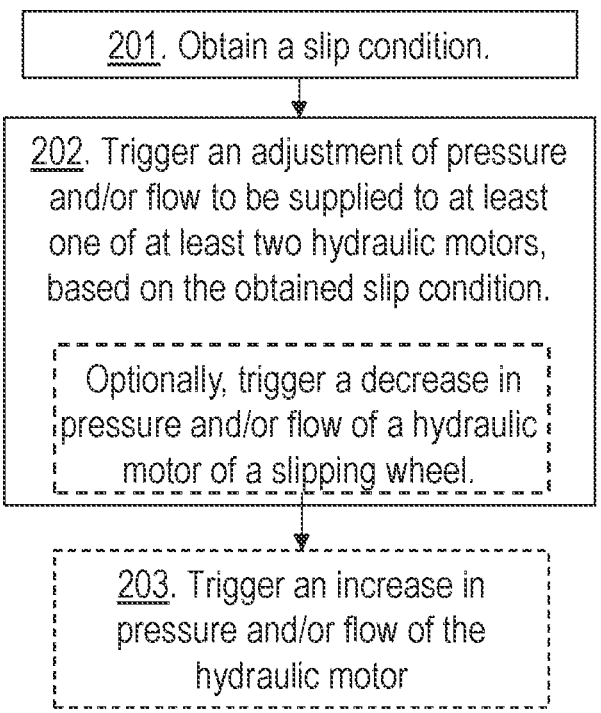
FIG. 2 illustrates an exemplary flowchart of a method according to an example.

FIG. 2 is an exemplary flowchart of a method according to an example. The method may be a computer-implemented method for handling wheel slip of one or more wheels of the vehicle 1. The vehicle 1 comprises the first axle 10. The first axle 10 comprises the at least two wheels 12. Each of the at least two wheels 12 of the first axle 10 is drivable by the at least two hydraulic motors 11. Each hydraulic motor 11 is operable to drive a respective wheel out of the at least two wheels 12 of the first axle 10 based on a respective pressure and/or flow, e.g., an oil pressure and/or an oil flow. Each respective pressure and/or flow to each respective hydraulic motor 11 is individually controlled by the distribution valve 40 comprised in the vehicle 1. The pressure and/or flow is supplied by the source 30 comprised in the vehicle 1. The method may comprise one or more of the following actions in any suitable order. Dashed boxes in FIG. 2 indicates optional actions.

Action 201

The method comprises, by the processing circuitry 602 of the computer system 600, obtaining 201 a slip condition of the vehicle 1. The slip condition is indicative of a slip in the at least two wheels 12 of the first axle 10 and/or at least two wheels 20 of a second axle 20.

In some examples, the slip condition may indicate that all or one wheel of the at least two wheels 12 of the first axle 10 is slipping.

In some examples, the slip condition may indicate that all or one wheel of the at least two wheels 22 of the second axle 20 is slipping.

In some examples, the slip condition may indicate a speed difference between the one or more wheels 12 of the first axle 10, e.g., the at least two wheels of the first axle 10, and one or more wheels 22 of the second axle 20, e.g., the at least two wheels of the second axle 20.

In some examples, obtaining the slip condition of the vehicle 1 comprises obtaining wheel speeds of the at least two wheels 12 of the first axle 10 and/or wheels speeds of the at least two wheels 22 of the second axle 20.

In some examples, obtaining the slip condition of the vehicle 1 comprises any one or more out of:
 obtaining a difference in wheel speed between the at least two wheels 22 of the first axle 10, and/or
 obtaining a difference in wheel speed between the at least two wheels 22 of the second axle 20,
 obtaining a difference in wheel speed between wheels 22 of the second axle 20 and wheels 12 of the first axle 10.

Wheel speed as used herein may mean a rotational speed of a wheel. The wheel speed may be obtained in any suitable manner.

In other words, slip condition as used herein may comprise wheels speed information.

Obtaining the slip condition may further, in some examples, comprise obtaining a steering wheel angle of the vehicle 1.

Action 202

The method comprises, by the processing circuitry 602, based on the obtained slip condition, triggering an adjustment of pressure and/or flow to be supplied to at least one of the at least two hydraulic motors 11, by any one or both of:
 based on the obtained slip condition, triggering an adjustment of a pressure and/or flow distribution in the distribution valve 40 and/or based on the obtained slip condition, triggering an adjustment of the pressure and/or flow supplied by the source 30.

In other words, the method may comprise decreasing and/or increasing a flow and/or pressure supplied by the source 30. Additionally or alternatively, the pressure and/or flow supplied by the source 30 is then controlled such that the pressure and/or flow distribution in the distribution valve 40 controls flow and/or pressure to be pass through the distribution valve 40 to each respective hydraulic motor in the at least two hydraulic motors 11. The distribution valve 40 may individually, per hydraulic motor in the at least two hydraulic motors 11, control what pressure and/or flow is allowed to pass through and drive each respective hydraulic motor in the at least two hydraulic motors 11.

In some examples, triggering the adjustment of the pressure and/or flow distribution in the distribution valve 40 comprises, based on the obtained slip condition, adjusting a distribution of pressure and/or flow in the distribution valve 40, to be distributed by the distribution valve 40 between the at least two hydraulic motors 11. In this way, each respective hydraulic motor in the at least two hydraulic motors 11 can be operated to account for the slip condition.

In some examples, triggering the adjustment of the pressure and/or flow distribution in the distribution valve 40 comprises adjusting an individual pressure and/or flow of at least one hydraulic motor of the at least two hydraulic motors 11 by adjusting a respective proportional valve 41, 42 of the distribution valve 40 based on the obtained slip condition. Each respective proportional valve 41, 42 is arranged to individually control a respective pressure and/or flow of the at least one hydraulic motor. In this way, each respective hydraulic motor in the at least two hydraulic motors 11 can be operated to account for the slip condition in an individual manner. This means that if a pressure and/or flow is decreased in one hydraulic motor in the at least two hydraulic motors 11, the pressure and/or flow supplied to the other hydraulic motors in the at least two hydraulic motors 11 does not need to be affected. This may for example be achieved by controlling the pressure and/or flow supplied by the source 30 while also controlling the pressure and/or flow towards each hydraulic motors in the at least two hydraulic motors 11 individually.

In some examples, triggering the adjustment of the pressure and/or flow supplied by the source 30 comprises, triggering the source 30 to initiate a pressure and/or flow supplied by the source 30 based on the obtained slip condition. In other words, examples herein may take place before or after pressure and/or flow supply has been initiated by the source 30.

In some examples, when the obtained slip condition indicates a slip above a threshold in any one or more out of the at least two wheels 22 of the second axle 20, triggering the adjustment of pressure and/or flow to be supplied to the at least one of the at least two hydraulic motors 11 comprises triggering an increase of pressure and/or flow to be supplied to each of the at least two hydraulic motors 11. In other words when the at least two wheels 22 of the second axle 20 slip, the at least two hydraulic motors 11 may compensate for the slip by increasing pressure, and thereby applying an increased torque on the at least two wheels 12 of the first wheel 10, which thereby drives the vehicle 1 and reduces slip on the at least two wheels 22 of the second axle 20.

In some examples, when the obtained slip condition indicates a slip above a threshold in a slipping wheel of the at least two wheels 12 of the first axle 10, triggering the adjustment of pressure and/or flow to be supplied to the at least one of the at least two hydraulic motors 11 comprises triggering a decrease in pressure and/or flow of a respective hydraulic motor of the slipping wheel.

In other words, when the at least two wheels 12 of the first axle 10 is already driven by the at least two hydraulic motors 11, and at least one of them slip, pressure and/or flow is decreased to reduce said slip of the slipping wheel.

In some examples, triggering the adjustment of the pressure and/or flow to be supplied to the at least one of the at least two hydraulic motors 11 comprises maintaining a pressure and/or flow to be supplied to a hydraulic motor of the at least two hydraulic motors 11, which hydraulic motor is driving a non-slipping wheel out of the at least two wheels 12 of the first axle 10. In other words, the pressure and/or flow to the at least one of the at least two hydraulic motors 11 may be individually controlled such that one hydraulic motor of the at least two hydraulic motors 11 can be supplied with increased or decreased pressure and/or flow, while another hydraulic motor of the at least two hydraulic motors 11 can be supplied with a maintained flow. This is possible e.g., since the distribution valve 40 is arranged to control the pressure and/or flow of each respective hydraulic motor of the at least two hydraulic motors 11, and optionally wherein the supply 30 can be configured to increase and/or decrease pressure and/or flow while adjusting pressure and/or flow in the distribution valve 40.

In some examples, when the obtained slip condition indicates a slip above a threshold in each of the at least two wheels 12 of the first axle 10, triggering the adjustment of pressure and/or flow to be supplied to the at least one of the at least two hydraulic motors by triggering a decrease in pressure and/or flow of each of the at least two hydraulic motors 11.

In other words, if both of the at least two wheels 12 of the first axle 10 slip, the pressure and/or flow may need to be reduced, e.g., by reducing the pressure and/or flow of the source 30 and/or by individually limiting the pressure and/or flow to each of the at least two hydraulic motors 11 in the distribution valve, e.g., using the separate proportional valves 41, 42.

In some examples, triggering the adjustment of pressure and/or flow to be supplied to the at least one of the at least two hydraulic motors 11 is further based on a steering wheel angle of the vehicle 1. The steering wheel angle of the vehicle 1 may be obtained by the use of any suitable method, e.g., by a sensor in the vehicle 1. The steering wheel angle of the vehicle 1 may be obtained e.g., as part of action 201 above.

In other words, flow and/pressure may be adapted in the at least one of the at least two hydraulic motors 11 based on the steering wheel angle of the vehicle 1 and the slip condition obtained in action 201. Some examples of this would be if turning left, a right-most wheel of the at least two wheels 12 of the first axle 10 may need increased rotational speed of a left-most wheel of the at least two wheels 12 of the first axle 10, e.g., and further adjusted for their slip which affects how much pressure and/or flow needs to be supplied to each of the at least two hydraulic motors 11. For example, if one wheel of the at least two wheels 12 of the first axle 10 is slipping, a pressure and/or flow to a respective hydraulic motors 11 may need to be increased.

In some examples, triggering the adjustment of pressure and/or flow to be supplied to at least one of the at least two hydraulic motors 11, further comprises obtaining a current pressure and/or flow of the at least two hydraulic motors 11 and wherein triggering the adjustment of pressure and/or flow to be supplied to at least one of the at least two hydraulic motors 11 is based on the obtained current pressure and/or flow of the at least two hydraulic motors 11.

In some examples, triggering the adjustment of pressure and/or flow to be supplied to at least one of the at least two hydraulic motors 11, comprises adjusting the pressure and/or flow to be supplied to at least one of the at least two hydraulic motors 11 such that at least one wheel of the at least two wheels 12 of the first axle 10 is synchronized with a wheel speed of another wheel of the first axle 10 and/or the second axle 20.

In other words, if a wheel in the vehicle 1 is slipping, synchronizing wheel speeds between slipping and non-slipping wheels may cause improved traction of the vehicle 1 and may reduce slippage in the slipping wheel. This may be achieved by increasing and/or decreasing pressure and/or flow of the at least two hydraulic motors 11.

In some examples, adjusting the flow and/or pressure of a hydraulic motor of the at least two hydraulic motors 11 affects traction and/or drivability of the vehicle 1.

In some examples, adjusting the flow and/or pressure of a hydraulic motor of the at least two hydraulic motors 11 may comprise adjusting a pressure provided by the source 30, which also corresponds to a change in flow from the source, or vice versa.

In some examples, triggering the adjustment of pressure and/or flow to be supplied to at least one of the at least two hydraulic motors 11, based on the obtained slip condition, comprises obtaining, e.g., as in action 201, and comparing wheel speeds of the at least two wheels 12 of the first axle 10 and/or the at least two wheels 22 of the second axle 20. This is since pressure and/or flow to be supplied to at least one of the at least two hydraulic motors 11 may need to be adjusted such that a slipping wheel matches a wheel speed of a non-slipping wheel. E.g., by increasing and/or decreasing pressure and/or flow in one or more out of the at least two hydraulic motors 11.

Action 203

In some examples the method further comprises, after a time period after decreasing the pressure and/or flow of the respective hydraulic motor 11 of the slipping wheel, e.g., as in action 202, and upon detecting that a slip of the slipping wheel is below a threshold, triggering an increase in pressure and/or flow of the respective hydraulic motor of the slipping wheel. In other words, when the at least two wheels 12 of the first axle 10 is driven by the at least two hydraulic motors 11, and at least one of them slip, pressure and/or flow is first decreased to reduce said slip, and when the slip is below a threshold, the pressure and/or flow of the respective hydraulic motor of the slipping wheel may then be increase again to improve traction.

Figure 3:
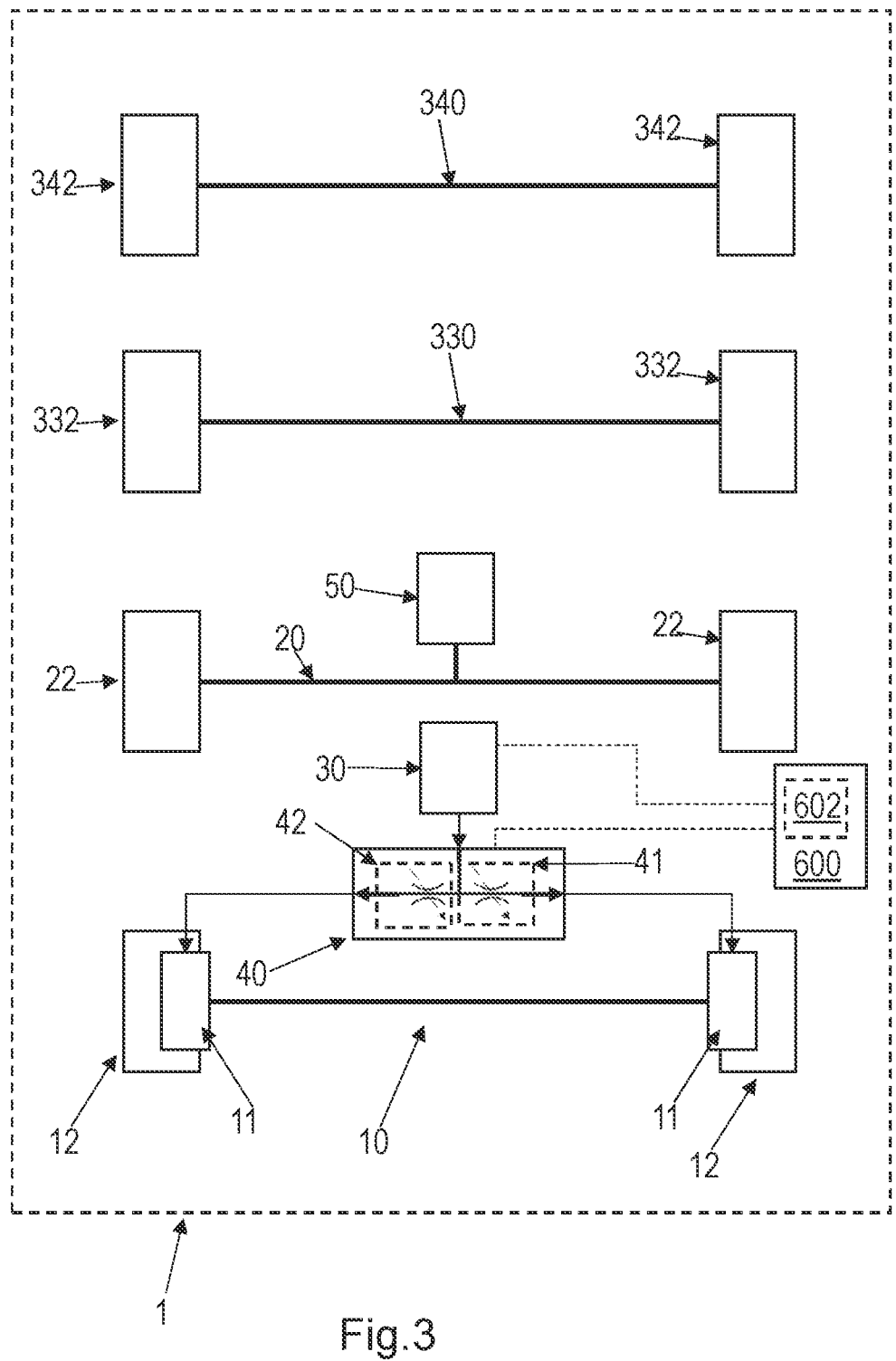
FIG. 3 illustrates an exemplary vehicle according to an example.

FIG. 3 illustrates vehicle 1 according to an example. In the example of FIG. 3, the vehicle 1 is a 4×8 truck, meaning it has four axles and eight wheels.

In this and some other examples, the vehicle 1 comprises the first axles 10, the second axle 20, a third axle 330, and a fourth axle 340.

In this example, the fourth axle 340 is the front axle of the vehicle 1.

The fourth axle comprises two wheels 342. The third axle comprises two wheels 332.

The second axle 20 comprises the at least two wheels 22, driven by the at least one combustion engine and/or electric motor 50.

The first axle 10 comprises the at least two wheels 12. In this and some other examples, the first axle 10 is the rear axle of the vehicle 1.

The at least two wheels of the first axle 12 is driven by the at least two hydraulic motors 11.

The at least two hydraulic motors 11 is driven by pressure and/or flow, e.g., oil pressure and/or oil flow, supplied by the source 30, e.g., an oil pump, and distributed by the distribution valve 40. The distribution valve 40 may individually control pressure and/or flow to each respective hydraulic motor of the at least two hydraulic motors 11 by means of the respective proportional valves 41, 42.

The computer system 600 and/or the processing circuitry 602 may be able to control a pressure and/or flow supplied by the source 30, e.g., by adjusting and/or initiating flow and/or pressure of the source 30.

The computer system 600 and/or the processing circuitry 602 may be able to individually control pressure to be supplied to each respective hydraulic motor in the at least two hydraulic motors 11 by adjusting flow and/or pressure allowed by the distribution valve 40, to pass through to each respective hydraulic motor in the at least two hydraulic motors 11, e.g., by adjusting any one or more out of the proportional valves 41, 42.

Further Examples and/or Variations

Examples herein may comprise hydraulic pump, e.g., the source 30, which may provide a high-pressure oil, to hydraulic motors, e.g., the at least two hydraulic motors 11, in wheels of the vehicle 1, e.g., the at least two wheels 12 of the first axle 10. An Electronic Control Unit (ECU), e.g., as part of the computer system 600 and/or processing circuitry 602, may control the pressure and/or flow to the at least two hydraulic motors 11. In below examples ECU may mean the computer system 600 and/or processing circuitry 602.

Some examples herein comprise adding proportional valves, e.g., the proportional valves 41, 42 and/or the distribution valve 40, in a hydraulic circuit, between a pump, e.g., the source 30, and the at least two hydraulic motors 11, which will manage the flow and/or pressure for each hydraulic motor.

In some examples, the ECU e.g., the computer system 600 and/or processing circuitry 602, will be configured to obtain any one or more out of the following information, e.g., using sensors in the vehicle 1:

vehicle speed of the vehicle 1,
wheels speed of a mechanical drive, e.g., rotational speed of any one or more out of the at least two wheels 22 of the second axle 20,
wheel speed of the hydraulic driven wheels, e.g., rotational speed of any one or more out of the at least two wheels 12 of the first axle 10,
an engine speed, e.g., torque applied to the second axle 20, and/or
a steering wheel angle.

In some examples, the ECU may monitor, e.g., continuously obtain, the wheel speeds of the at least two wheels 12 of the first axle 10 and/or the at least two wheels 22 of the second axle 20, e.g., as part of action 201.

The ECU may be configured to adjust the flow and/or pressure so that the at least two hydraulic motors 11 drive the at least two wheels 12 of the first axle 10 at the same speed as the at least two wheels 22 of the second axle 20. This may be considered to be related to an optimum traction of the vehicle 1, e.g., under certain circumstances.

If the at least two wheels 22 of the second axle 20 start to slip, e.g., slip above a threshold, a speed difference will be measured between the at least two wheels 22 of the second axle 20 and the at least two wheels 12 of the first axle 10, e.g., as part of action 201. The ECU may then increase the pressure in the at least two hydraulic motors 11, e.g., as in action 202, to increase torque and speed in the at least two wheels 12 of the first axle 10.

If one of the wheels of the first axle 10 starts to slip, e.g., slip above a threshold, a speed difference will be measured between the left and right front wheel of the at least two wheels 12 of the first axle 10. The ECU may decrease the pressure and/or flow through the hydraulic motor of the wheel that is slipping until a speed of the slipping wheel matches the at least two wheels 22 of the second axle 20, e.g., the speed of the slipping wheel is within a threshold of a wheel 22 of the second axle 20, e.g., as in action 202. At the same time, the ECU may ensure that pressure and/or flow through a wheel that kept a grip, e.g., a slip below a threshold, is maintained, to maintain the speed matching the at least two wheels 22 of the second axle 20, e.g., as in action 202.

When the slipping wheel recovers grip, e.g., a slip below a threshold, the rotational speed of the slipping wheel will drop. The ECU may then increase pressure and/or flow in the respective hydraulic motor to maintain the same wheel speed as int the at least two wheels 22 of the second axle 20.

If all of the at least two wheels 12 of the first axle 10 start to slip, e.g., slip above a threshold, a speed difference will be measured between front and rear wheel of the first axle 10. The ECU may then reduce pressure and/or flow through both at least two hydraulic motors 11 to reach the same rotational speed as the at least two wheels 22 of the second axle 20.

In some examples, a steering wheel angle of the vehicle 1 may be accounted for, e.g., if a driver is steering the vehicle 1. In these examples the at least two wheels 12 of the first axle 10 may be steerable. The different wheels speeds of the at least two wheels 12 of the first axle 10 may be obtained, e.g., different wheels speeds between left and right wheels in absolute or relative measures, e.g., as part of the slip condition. The steering wheel angle may then be used to calculate a pressure and/or flow needed in each hydraulic motor of the at least two hydraulic motors 11 to reach a target speed for each individual wheel in the at least two wheels 12 of the first axle 10, e.g., as in action 202.

Figure 4:
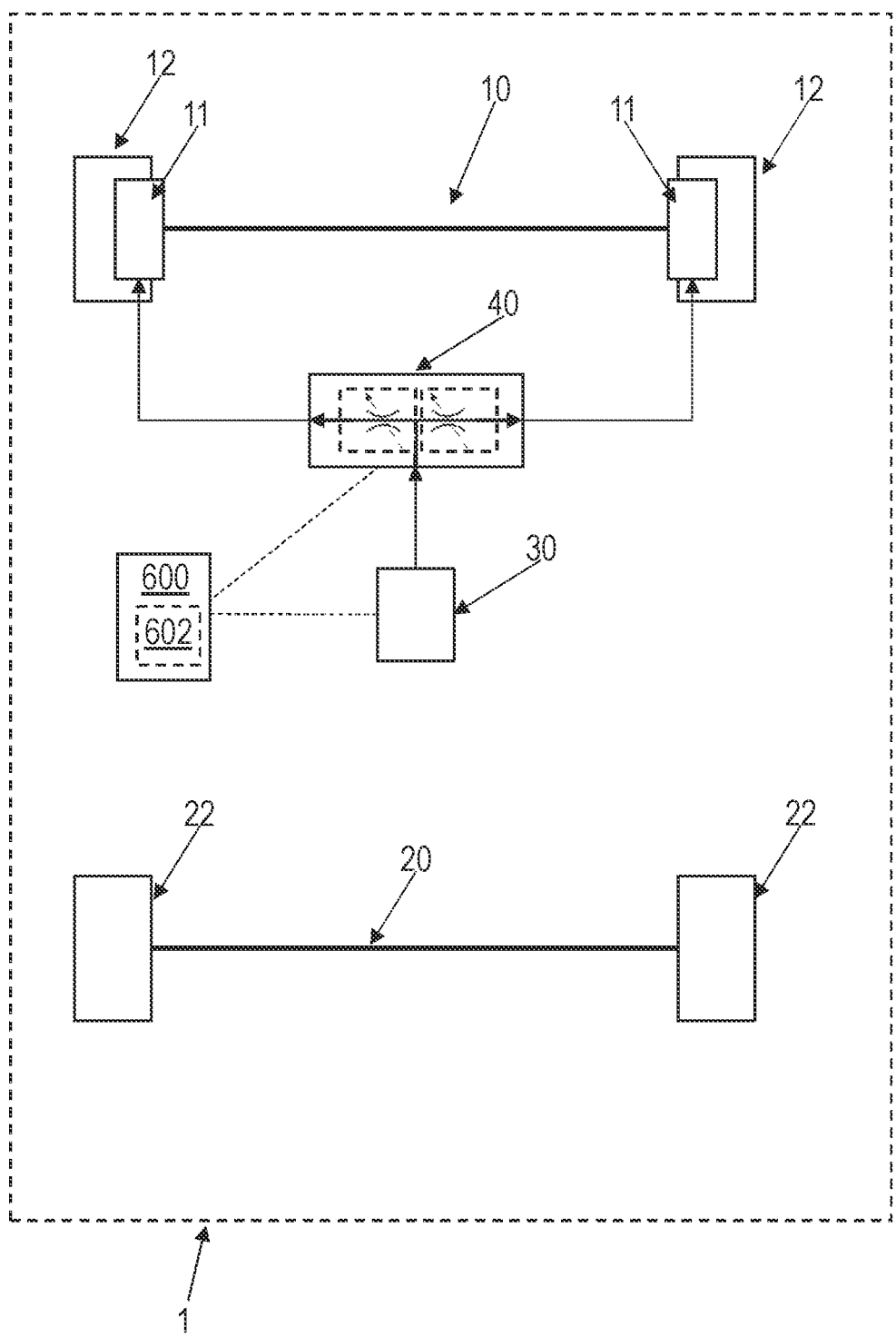
FIG. 4 illustrates another view of FIG. 1, according to an example.

FIG. 4 is another view of FIG. 1, according to an example. The computer system 600 comprises processing circuitry 602 configured to handle wheel slip of one or more wheels of the vehicle 1. The vehicle 1 comprises the first axle 10. The first axle 10 comprises the at least two wheels 12. Each of the at least two wheels 12 of the first axle 10 is drivable by the at least two hydraulic motors 11. Each hydraulic motor 11 is operable to drive a respective wheel out of the at least two wheels 12 of the first axle 10 based on a respective pressure and/or flow. Each respective pressure and/or flow to each respective hydraulic motor 11 is individually controlled by a distribution valve 40 comprised in the vehicle 1. The pressure and/or flow is supplied by the source 30 comprised in the vehicle 1.

The processing circuitry 602 is configured to:
  obtain a slip condition of the vehicle 1, the slip condition being indicative of a slip in the at least two wheels 12 of the first axle 10 and/or at least two wheels 22 of a second axle 20,
  based on the obtained slip condition, trigger an adjustment of pressure and/or flow to be supplied to at least one of the at least two hydraulic motors 11, by any one or both of:

i. based on the obtained slip condition, triggering an adjustment of a pressure and/or flow distribution in the distribution valve 40, and/or
  ii. based on the obtained slip condition, triggering an adjustment of the pressure and/or flow supplied by the source 30.

Figure 5:
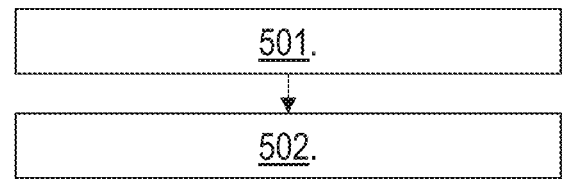
FIG. 5 illustrates a flow chart of a method according to an example.

FIG. 5 is a flow chart of a method according to an example. The method may be a computer-implemented method for handling wheel slip of one or more wheels of the vehicle 1. The vehicle 1 comprises the first axle 10. The first axle 10 comprises at least two wheels 12. Each of the at least two wheels 12 of the first axle 10 is drivable by the at least two hydraulic motors 11. Each hydraulic motor 11 is operable to drive a respective wheel out of the at least two wheels 12 of the first axle 10, based on a respective pressure and/or flow. Each respective pressure and/or flow to each respective hydraulic motor 11 is individually controlled by the distribution valve 40 comprised in the vehicle 1. The pressure and/or flow is supplied by the source 30 comprised in the vehicle 1.

The method comprises, by the processing circuitry 602 of the computer system 600, obtaining 501 a slip condition of the vehicle 1. The slip condition is indicative of a slip in the at least two wheels 12 of the first axle 10 and/or at least two wheels 22 of a second axle 20. The method comprises, by the processing circuitry 602, based on the obtained slip condition, triggering 502 an adjustment of pressure and/or flow to be supplied to at least one of the at least two hydraulic motors 11, by any one or both of:
  based on the obtained slip condition, triggering an adjustment of a pressure and/or flow distribution in the distribution valve 40, and/or
  based on the obtained slip condition, triggering an adjustment of the pressure and/or flow supplied by the source 30.

Figure 6:
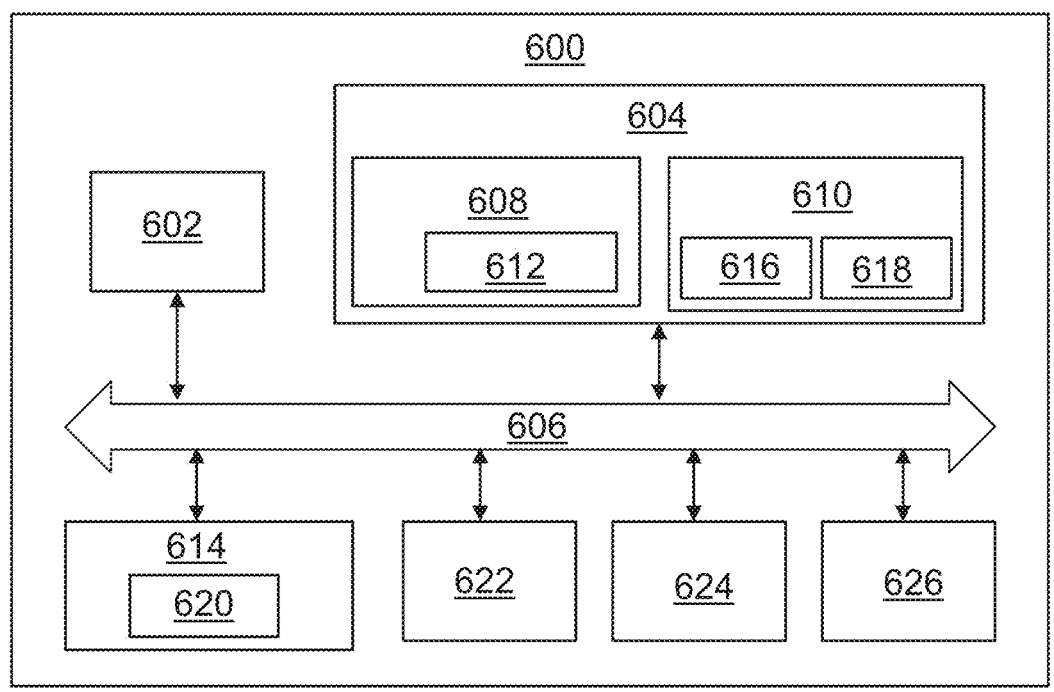
FIG. 6 illustrates a schematic diagram of a computer system according to an example.

FIG. 6 is a schematic diagram of the computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include the processing circuitry 602 (e.g., processing circuitry including one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Below follows a few Examples of methods, programs, devices and/or other entities herein.

Example 1

A computer-implemented method for handling wheel slip of one or more wheels of a vehicle 1, wherein the vehicle 1 comprises a first axle 10, wherein the first axle 10 comprises at least two wheels, wherein each of the at least two wheels of the first axle 12 is drivable by at least two hydraulic motors 11, wherein each hydraulic motor 11 is operable to drive a respective wheel out of the at least two wheels of the first axle 12 based on a respective pressure and/or flow, e.g., an oil pressure and/or an oil flow, wherein each respective pressure and/or flow to each respective hydraulic motor 11 is individually controlled by a distribution valve 40 comprised in the vehicle 1, and wherein the pressure and/or flow is supplied by a source 30 comprised in the vehicle 1, the method comprising:

by processing circuitry 602 of a computer system 600, obtaining 201, 501 a slip condition of the vehicle 1, the slip condition being indicative of a slip in the at least two wheels of the first axle 12 and/or at least two wheels of a second axle 22, by the processing circuitry 602, based on the obtained slip condition, triggering 202, 502 an adjustment of pressure and/or flow to be supplied to at least one of the at least two hydraulic motors 11, by any one or both of:
  i. based on the obtained slip condition, triggering an adjustment of a pressure and/or flow distribution in the distribution valve 40 and/or
  ii. based on the obtained slip condition, triggering an adjustment of the pressure and/or flow supplied by the source 30.

Example 2

A computer system 600 comprising processing circuitry 602 configured to handle wheel slip of one or more wheels of a vehicle 1, wherein the vehicle 1 comprises a first axle 10, wherein the first axle 10 comprises at least two wheels, wherein each of the at least two wheels of the first axle 12 is drivable by at least two hydraulic motors 11, wherein each hydraulic motor 11 is operable to drive a respective wheel out of the at least two wheels of the first axle 12 based on a respective pressure and/or flow, e.g., an oil pressure and/or an oil flow, wherein each respective pressure and/or flow to each respective hydraulic motor 11 is individually controlled by a distribution valve 40 comprised in the vehicle 1, and wherein the pressure and/or flow is supplied by a source 30 comprised in the vehicle 1, the processing circuitry 602 further being configured to:
  obtain a slip condition of the vehicle 1, the slip condition being indicative of a slip in the at least two wheels of the first axle 12 and/or at least two wheels of a second axle 22,
  based on the obtained slip condition, trigger an adjustment of pressure and/or flow to be supplied to at least one of the at least two hydraulic motors 11, by any one or both of:
    i. based on the obtained slip condition, triggering an adjustment of a pressure and/or flow distribution in the distribution valve 40, and/or
    ii. based on the obtained slip condition, triggering an adjustment of the pressure and/or flow supplied by the source 30.

Example 3

The computer system 600 of Example 2, wherein triggering the adjustment of the pressure and/or flow distribution in the distribution valve 40 comprises, based on the obtained slip condition, adjusting a distribution of pressure and/or flow in the distribution valve 40, to be distributed by the distribution valve 40 between the at least two hydraulic motors 11.

Example 4

The computer system 600 of Example 2, wherein triggering the adjustment of the pressure and/or flow distribution in the distribution valve 40 comprises adjusting an individual pressure and/or flow of at least one hydraulic motor of the at least two hydraulic motors 11 by adjusting a respective proportional valve 41, 42 of the distribution valve 40 based on the obtained slip condition, wherein the respective proportional valve 41, 42 is arranged to individually control a respective pressure and/or flow of the at least one hydraulic motor.

Example 5

The computer system 600 of Example 2, wherein triggering the adjustment of the pressure and/or flow supplied by the source 30 comprises, based on the obtained slip condition, triggering the source 30 to initiate a pressure and/or flow supplied by the source 30.

Example 6

The computer system 600 of Example 2, wherein when the obtained slip condition indicates a slip above a threshold in any one or more out of the at least two wheels of the second axle 22, triggering 202, 502 the adjustment of pressure and/or flow to be supplied to the at least one of the at least two hydraulic motors by triggering an increase of pressure and/or flow to be supplied to each of the at least two hydraulic motors 11.

Example 7

The computer system 600 of Example 2, wherein when the obtained slip condition indicates a slip above a threshold in a slipping wheel of the at least two wheels of the first axle 12, triggering 202, 502 the adjustment of pressure and/or flow to be supplied to the at least one of the at least two hydraulic motors 11 comprises triggering a decrease in pressure and/or flow of a respective hydraulic motor of the slipping wheel.

Example 8

The computer system 600 of Example 7, wherein the method further comprises after a time period after decreasing the pressure and/or flow of the respective hydraulic motor of the slipping wheel, upon detecting that a slip of the slipping wheel is below a threshold, triggering 203 an increase in pressure and/or flow of the respective hydraulic motor of the slipping wheel.

Example 9

The computer system 600 of Example 7, wherein triggering 202, 502 the adjustment of the pressure and/or flow to be supplied to the at least one of the at least two hydraulic motors 11 further comprises maintaining a pressure and/or flow to be supplied to a hydraulic motor of the at least two hydraulic motors, which hydraulic motor is driving a non-slipping wheel out of the at least two wheels of the first axle 12.

Example 10

The computer system 600 of Example 2, wherein when the obtained slip condition indicates a slip above a threshold in each of the at least two wheels of the first axle 12, triggering 202, 502 the adjustment of pressure and/or flow to be supplied to the at least one of the at least two hydraulic motors by triggering a decrease in pressure and/or flow of each of the at least two hydraulic motors 11.

Example 11

The computer system 600 of Example 2, wherein triggering 202, 502 the adjustment of the pressure and/or flow to be supplied to the at least one of the at least two hydraulic motors is further based on a steering wheel angle of the vehicle 1.

Example 12

The computer system 600 of Example 2, wherein obtaining 201, 501 the slip condition of the vehicle 1 comprises obtaining wheel speeds of the at least two wheels of the first axle 12 and/or wheels speeds of the at least two wheels of the second axle 22.

Example 13

The computer system 600 of Example 12, wherein obtaining 201, 501 the slip condition of the vehicle 1 comprises any one or more out of:
- obtaining a difference in wheel speed between the at least two wheels of the first axle 12, and/or
- obtaining a difference in wheel speed between the at least two wheels of the second axle 22,
- obtaining a difference in wheel speed between wheels of the second axle 22 and wheels of the first axle 12.

Example 14

A vehicle 1 comprising the computer system 600 of Example 2.

Example 15

The vehicle 1 of Example 14, wherein the vehicle 1 comprises a first axle 10, wherein the first axle 10 comprises at least two wheels, wherein each of the at least two wheels of the first axle 12 is drivable by at least two hydraulic motors 11, wherein each hydraulic motor 11 is operable to drive a respective wheel out of the at least two wheels of the first axle 12 based on a respective pressure and/or flow, e.g., an oil pressure and/or an oil flow, wherein each respective pressure and/or flow to each respective hydraulic motor 11 is individually controlled by a distribution valve 40 comprised in the vehicle 1, and wherein the pressure and/or flow is supplied by a source 30 comprised in the vehicle 1.

Example 16

The vehicle 1 of Example 15, wherein the vehicle 1 comprises a second axle 20 and the second axle 20 comprises at least two wheels 22, wherein each of the at least two wheels of the second axle 22 is drivable by at least one electric motor 50 and/or combustion engine 50 comprised in the vehicle 1.

Example 17

The vehicle 1 of Example 16, wherein the at least two hydraulic motors are arranged to compensate for a wheel slip in one or more wheels of the vehicle 1, when the at least one electric motor 50 and/or combustion engine 50 applies a torque to any one or more out of the at least two wheels of the second axle 22.

Example 18

The vehicle 1 of Example 15, wherein a processing circuitry 602 of the computer system 600 is configured to perform the method according to any of Examples above.

Example 19

A computer program product comprising program code for performing, when executed by the processing circuitry 602, to perform the method of Example 1.

Example 20

A non-transitory computer-readable storage medium comprising instructions, which when executed by the processing circuitry 602, cause the processing circuitry 602 to perform the method of Example 1.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to handle wheel slip of one or more wheels of a vehicle, wherein the vehicle comprises a first axle, wherein the first axle comprises at least two wheels, wherein each of the at least two wheels of the first axle is drivable by at least two hydraulic motors, wherein each hydraulic motor is operable to drive a respective wheel out of the at least two wheels of the first axle based on a respective pressure and/or flow, wherein each respective pressure and/or flow to each respective hydraulic motor is individually controlled by a distribution valve comprised in the vehicle, and wherein the pressure and/or flow is supplied by a source comprised in the vehicle, the processing circuitry further being configured to:
 obtain a slip condition of the vehicle, the slip condition being indicative of a slip in the at least two wheels of the first axle; and
 based on the obtained slip condition, trigger an adjustment of pressure and/or flow to be supplied to at least one of the at least two hydraulic motors, by any one or both of:
  based on the obtained slip condition, triggering an adjustment of a pressure and/or flow distribution in the distribution valve; and/or
  based on the obtained slip condition, triggering an adjustment of the pressure and/or flow supplied by the source,
 wherein triggering the adjustment of pressure and/or flow to be supplied to the at least one of the at least two hydraulic motors comprises adjusting the pressure and/or flow to be supplied to the at least one of the at least two hydraulic motors such that at least one wheel of the at least two wheels of the first axle is synchronized with a wheel speed of another wheel of a second axle.

2. A vehicle comprising the computer system of claim 1.

3. A computer-implemented method for handling wheel slip of one or more wheels of a vehicle, wherein the vehicle comprises a first axle, wherein the first axle comprises at least two wheels, wherein each of the at least two wheels of the first axle is drivable by at least two hydraulic motors, wherein each hydraulic motor is operable to drive a respective wheel out of the at least two wheels of the first axle based on a respective pressure and/or flow wherein each respective pressure and/or flow to each respective hydraulic motor is individually controlled by a distribution valve comprised in the vehicle, and wherein the pressure and/or flow is supplied by a source comprised in the vehicle, the method comprising:
 by processing circuitry of a computer system, obtaining a slip condition of the vehicle, the slip condition being indicative of a slip in the at least two wheels of the first axle; and
 by the processing circuitry, based on the obtained slip condition, triggering an adjustment of pressure and/or flow to be supplied to at least one of the at least two hydraulic motors, by any one or both of:
  based on the obtained slip condition, triggering an adjustment of a pressure and/or flow distribution in the distribution valve; and/or
  based on the obtained slip condition, triggering an adjustment of the pressure and/or flow supplied by the source;
 wherein triggering the adjustment of pressure and/or flow to be supplied to the at least one of the at least two hydraulic motors comprises adjusting the pressure and/or flow to be supplied to the at least one of the at least two hydraulic motors such that at least one wheel of the at least two wheels of the first axle is synchronized with a wheel speed of another wheel of a second axle.

4. The method of claim 3, wherein the triggering the adjustment of the pressure and/or flow distribution in the distribution valve comprises, based on the obtained slip condition, adjusting a distribution of pressure and/or flow in the distribution valve, to be distributed by the distribution valve between the at least two hydraulic motors.

5. The method of claim 3, wherein the triggering the adjustment of the pressure and/or flow distribution in the distribution valve comprises adjusting an individual pressure and/or flow of at least one hydraulic motor of the at least two hydraulic motors by adjusting a respective proportional valve of the distribution valve based on the obtained slip condition, wherein the respective proportional valve is arranged to individually control a respective pressure and/or flow of the at least one hydraulic motor.

6. The method of claim 3, wherein the triggering the adjustment of the pressure and/or flow supplied by the source comprises, based on the obtained slip condition, triggering the source to initiate a pressure and/or flow supplied by the source.

7. The method of claim 3, wherein when the obtained slip condition indicates a slip above a threshold in any one or more out of the at least two wheels of the second axle, triggering the adjustment of pressure and/or flow to be supplied to the at least one of the at least two hydraulic motors by triggering an increase of pressure and/or flow to be supplied to each of the at least two hydraulic motors.

8. The method of claim 3, wherein when the obtained slip condition indicates a slip above a threshold in a slipping wheel of the at least two wheels of the first axle, triggering the adjustment of pressure and/or flow to be supplied to the at least one of the at least two hydraulic motors comprises triggering a decrease in pressure and/or flow of a respective hydraulic motor of the slipping wheel.

9. The method of claim 8, wherein the method further comprises after a time period after decreasing the pressure and/or flow of the respective hydraulic motor of the slipping wheel, upon detecting that a slip of the slipping wheel is below a threshold, triggering an increase in pressure and/or flow of the respective hydraulic motor of the slipping wheel.

10. The method of claim 8, wherein the triggering the adjustment of the pressure and/or flow to be supplied to the at least one of the at least two hydraulic motors further comprises maintaining a pressure and/or flow to be supplied to a hydraulic motor of the at least two hydraulic motors, which hydraulic motor is driving a non-slipping wheel out of the at least two wheels of the first axle.

11. The method of claim 3, wherein the triggering the adjustment of pressure and/or flow to be supplied to the at least one of the at least two hydraulic motors is further based on a steering wheel angle of the vehicle.

12. The method of claim 3, wherein the obtaining the slip condition of the vehicle comprises obtaining wheel speeds of the at least two wheels of the first axle and/or wheels speeds of the at least two wheels of the second axle.

13. The method of claim 12, wherein the obtaining the slip condition of the vehicle comprises any one or more out of:
 obtaining a difference in wheel speed between the at least two wheels of the first axle;
 obtaining a difference in wheel speed between the at least two wheels of the second axle; and/or
 obtaining a difference in wheel speed between wheels of the second axle and wheels of the first axle.

14. A computer program product comprising program code for performing, when executed by the processing circuitry, the method of claim 3.

15. A non-transitory computer-readable storage medium comprising instructions, which when executed by the processing circuitry, cause the processing circuitry to perform the method of claim 3.

\* \* \* \* \*